(12) United States Patent
Niwa et al.

(10) Patent No.: US 6,332,497 B1
(45) Date of Patent: Dec. 25, 2001

(54) VEHICULAR AIR CONDITIONER

(75) Inventors: Kazuki Niwa; Ryosaku Akimoto, both of Nishi-kasugai-gun; Kenji Matsuda, Nagoya, all of (JP); Gregory A. Major, Beverly Hills; Xin Zeng, Auburn Hills, both of MI (US)

(73) Assignees: Mitsubishi Heavy Industries, Ltd., Tokyo (JP); General Motors Corporation, Detroit, MI (US)

( * ) Notice: Subject to any disclaimer, the term of this patent is extended or adjusted under 35 U.S.C. 154(b) by 0 days.

(21) Appl. No.: 09/326,603

(22) Filed: Jun. 7, 1999

(51) Int. Cl.[7] ........................................ B60H 1/00
(52) U.S. Cl. .................... 165/204; 165/43; 62/243; 62/244; 454/144; 454/156
(58) Field of Search .................. 165/42, 43, 202, 165/203, 204; 454/143, 144, 156; 62/243, 244; 237/12.3 A, 12.3 B

(56) References Cited

U.S. PATENT DOCUMENTS

| | | | |
|---|---|---|---|
| 2,294,036 | * | 8/1942 | Kettering ........................ 454/156 X |
| 2,667,336 | * | 1/1954 | Lehane et al. .................... 165/42 X |
| 3,455,595 | * | 7/1969 | Wessells, III et al. ......... 454/144 X |
| 3,595,029 | * | 7/1971 | Lende, Jr. ........................ 62/243 X |
| 3,656,541 | * | 4/1972 | Coyle et al. .................... 165/42 X |
| 3,817,054 | * | 6/1974 | Adams .................................. 62/243 |
| 3,908,900 | * | 9/1975 | Smith .............................. 454/144 X |
| 4,252,053 | * | 2/1981 | Muto et al. .................... 454/156 X |
| 4,324,286 | * | 4/1982 | Brett ...................................... 165/202 |
| 4,376,408 | * | 3/1983 | Iijima et al. .................. 454/156 X |
| 4,612,975 | * | 9/1986 | Ikari ........................................ 165/43 |
| 4,996,849 | * | 3/1991 | Burst et al. .................... 454/156 X |
| 5,054,378 | * | 10/1991 | Speece . |
| 5,167,129 | * | 12/1992 | Akasaka ........................ 454/144 X |
| 5,325,912 | * | 7/1994 | Hotta et al. .................... 165/204 |
| 5,902,181 | * | 5/1999 | Bain ................................... 454/144 |
| 5,904,052 | * | 5/1999 | Inoue et al. ................... 165/43 X |

FOREIGN PATENT DOCUMENTS

| | | | | |
|---|---|---|---|---|
| 25 08 955 A1 | * | 9/1976 | (DE) ................................ 454/144 |
| 1519406 | * | 2/1968 | (FR) ................................ 454/144 |
| 674502 | * | 6/1952 | (GB) ................................ 165/43 |
| 63-287622 A | * | 11/1988 | (JP) ................................ 454/156 |

* cited by examiner

*Primary Examiner*—Ljiljana Ciric
(74) *Attorney, Agent, or Firm*—Oblon, Spivak, McClelland, Maier & Neustadt, P.C.

(57) ABSTRACT

An air conditioner for a vehicle having an engine that serves as a drive source for a compressor arranged in a rear part of the vehicle. The air conditioner includes the compressor, and further includes an air intake unit having an inside air intake, an outside air intake, an inside air/outside air changeover damper, and a blower disposed on a downstream side of the inside air/outside air changeover damper. The air conditioner includes an air conditioning unit into which air is introduced from the air intake unit, provided along an introduced air distribution path with a cooling apparatus heat exchanger fluidly connected to the compressor and configured to exchange heat between the introduced air and air outside the cabin interior, where the cooling apparatus heat exchanger is located in the rear part of the vehicle. The air conditioning unit also include an engine heat exchanger configured to exchange heat between the introduced air and an engine of the vehicle. The air conditioner further includes a duct configured to distribute air from the air conditioning unit to a front part of the vehicle, where the duct is provided with air outlets configured to discharge the air into the cabin interior.

8 Claims, 8 Drawing Sheets

VEHICULAR AIR CONDITIONER

BACKGROUND OF THE INVENTION

1. Field of the Invention

The present invention relates to a vehicular air conditioner mounted in vehicles such as automobiles.

2. Description of the Related Art

A vehicular air conditioner which can provide comfortable vehicle cabin environment to passengers by conditioning air in the vehicle cabin of automobiles comprises equipment such as: a cooling apparatus comprising a compressor which uses the engine as a drive source, a condenser, an expansion valve, an evaporator, and piping for connecting these in a circuit and which is filled with operating gas; a heater core using an engine coolant as a heating source; a casing for housing the evaporator and the heater core and forming a predetermined air flow path; an air mix damper for adjusting the air quantity passing through the evaporator and the heater core; and a blower for blowing air.

In an upstream portion of the casing, there is provided an inside air/outside air changeover damper which can change over from an outside air intake to an inside air intake, and vice versa.

As a matter of course, there is also provided a blower along of the air flow path, and suitable air outlets are fitted for blowing air towards the windshield, the driver and the feet of the driver.

If the cooling apparatus is driven so as to only operate the evaporator, cooling is effected, and if only the heater core is operated, heating is effected. If the evaporator and the heater core are both operated at the same time, cooled air can be heated to effect dehumidification.

Temperature adjustment is performed by adjusting the ratio of the air quantity passing through the evaporator to the air quantity passing through the heater core, by means of the air mix damper. If the inside air/outside air changeover damper is changed to the inside air position, air conditioning is performed by circulation taking in air in the vehicle cabin from the air intake port. If the inside air/outside air changeover damper is changed to the outside air position, air conditioning is performed by taking in outside air and blowing the conditioned air into the vehicle cabin.

For example with the above described air conditioner, in the case of a standard front-engine type sedan passenger vehicle, the air conditioner is installed in the engine room below the dashboard on an assistant driver's side as seen from inside of the vehicle cabin. In this case, the inside air intake for drawing in air from the vehicle cabin opens below the dashboard on the assistant driver's side.

With the above described air conditioner, the following operation modes can be selected by opening and closing various dampers.

"Face blowing mode" is for blowing cool air from a face air outlet toward a passengers' upper body at the time of operating the air conditioner, mainly in the summer season.

"Foot blowing mode" is for blowing warm air from a foot air outlet toward the feet of passengers at the time of heating, mainly in the winter season.

The above described conventional air conditioner can be operated by selecting either of an inside air circulating operation for drawing in air in the vehicle cabin (inside air) and blowing the conditioned air into the vehicle cabin, or an outside air introducing operation for introducing air outside the vehicle cabin (outside air) and blowing the conditioned air into the vehicle cabin, by opening or closing the inside air/outside air changeover damper.

With the above described conventional air conditioner, conditioned air can only be blown to the front seat side, and air conditioning of the rear seat side is effected by circulating air blown toward the front seat side by air currents.

Therefore, on the front seat side, air can be blown directly toward the upper body or the feet of passengers, but it is not possible to blow air directly to passengers in the rear seat.

Moreover, since the air intake port for drawing in inside air is disposed in the front lower part in the vehicle cabin, generally under the dashboard on the assistant driver's side, sufficient circulation of air may not be effected over the whole region in the vehicle cabin at the time of the inside air circulating operation. In particular, at the time of heating when, in many cases, the inside air circulating operation is performed, warm air is circulated only on the front seat side, and hence stagnation occurs on the rear seat side.

On the rear seat side there is therefore a problem in that air conditioning is insufficient, so that comfort in the rear seat is compromised.

Furthermore, in the above description, an air conditioner mounted in a front-engine type vehicle has been described. In the case of mounting the air conditioner in a rear-engine type vehicle however, it is necessary to arrange the compressor in a rear part of the vehicle body together with the engine. Therefore, the refrigerant must be piped to the front part of the vehicle from the rear part, requiring more refrigerant and piping therefor. There is thus the problem of an increase in vehicle weight.

Moreover, in the case of the rear-engine type vehicle, there is a rear-blowing type in which a cooling apparatus is installed in the trunk and an air outlet is provided in the trunk. In this case, there is a problem in that the blown air does not reach the driver's seat, and the vehicle cabin cannot be uniformly air-conditioned.

SUMMARY OF THE INVENTION

In view of the above situation, it is an object of the present invention to provide a vehicular air conditioner which can uniformly condition air in a vehicle cabin. Moreover, it is an object of the present invention to provide a vehicular air conditioner which can reduce the vehicle weight of a rear-engine type vehicle.

The vehicular air conditioner of the present invention is a vehicular air conditioner mounted in a vehicle having a drive source for a compressor arranged in a rear part of the vehicle body, and is characterized in comprising:

a compressor arranged in a rear part of the vehicle body;

an air intake unit comprising an inside air intake for drawing in air from a vehicle cabin interior, an outside air intake for drawing in air from outside of the vehicle cabin, an inside air/outside air changeover damper for selectively determining from which of either the inside air intake or the outside air intake, air is to be drawn in, and a blower device disposed on a downstream side of the inside air/outside air changeover damper;

an air conditioning unit into which air is introduced from the air intake unit, provided along an introduced air distribution path with a cooling apparatus heat exchanger for exchanging heat between the introduced air and air outside the vehicle cabin and an engine heat exchanger for exchanging heat between the introduced air and the engine; and a duct into which air is introduced from the air conditioning unit for distributing the introduced air from the rear part of the vehicle to the front part thereof, provided with air outlets for discharging the introduced air into the vehicle cabin.

With this vehicular air conditioner, when an engine is used as a drive source for the compressor, and also when a drive source combining the engine and electrical power is used, refrigerant is compressed by the compressor provided in the vicinity of the engine arranged in the rear part of the vehicle, and heat is exchanged between the refrigerant and the introduced air by the cooling apparatus heat exchanger. Therefore, conditioned air is produced in the rear part of the vehicle. That is, conditioned air is not produced in the front part of the vehicle by sending the refrigerant to the front part, but is produced in the rear part and sent to the front part by the duct. Therefore, the quantity of refrigerant can be reduced, and an air outlet can be arranged along the duct to blow out air to the rear seat. Hence, there is no longer the problem as in the conventional design that air conditioning in the rear seat is insufficient.

For the drive source, there may be a motor driven by electricity, in addition to the one driven by the engine.

The duct may be located under a seat, and at a widthwise center of the vehicle.

Moreover, the air intake unit and the air conditioning unit may be provided in the vicinity of the drive source. Furthermore, the air intake unit and the air conditioning unit may be formed integrally.

The air outlets of the duct are provided in the front part of the vehicle and between the front seat and the rear seat, and are specifically constructed as follows.

The air outlets provided between the front seat and the rear seat are provided on both the upper face and sides of the duct, and there is provided an air outlet opening damper for controlling outlet of air from the air outlets. By adjusting the opening of the damper, the quantity of outlet air is controlled.

By arranging the air outlet in this way between the front seat and the rear seat, air conditioning in the rear seat can be sufficiently effected. Since the outlet air quantity is controlled by the damper, a vehicle cabin environment according to the preference of rear seat passengers can be obtained.

Moreover, the air outlet located in the front part of the vehicle is divided into a face air outlet provided on an upper face of the duct and foot air outlets provided on the sides of the duct.

Moreover, a partition plate for branching the duct into left and right flow paths is provided, and a lateral distribution damper for distributing air to the left and right flow paths is provided on an upstream side thereof.

By means of this damper, the air quantity distributed to the left and right sides is controlled. Specifically, by respectively providing in the left and right flow paths, air outlets for blowing air onto passengers on the left and right sides, then the air quantity outlet to the passengers on the left and right sides can be adjusted by controlling the lateral distribution damper.

Furthermore, a vertical distribution damper which turns up and down is provided on the downstream side of the lateral distribution damper, and air passing through an upper part of the damper is distributed to the face air outlet, and air passing through the lower part of the damper is distributed to the foot air outlet.

By controlling this damper, the quantity of air blown to the upper body and the feet of the passengers can be adjusted.

DESCRIPTION OF THE PREFERRED EMBODIMENT

As follows is a description of one embodiment of a vehicular air conditioner according to the present invention, with reference to the appended drawings.

Figure 1:
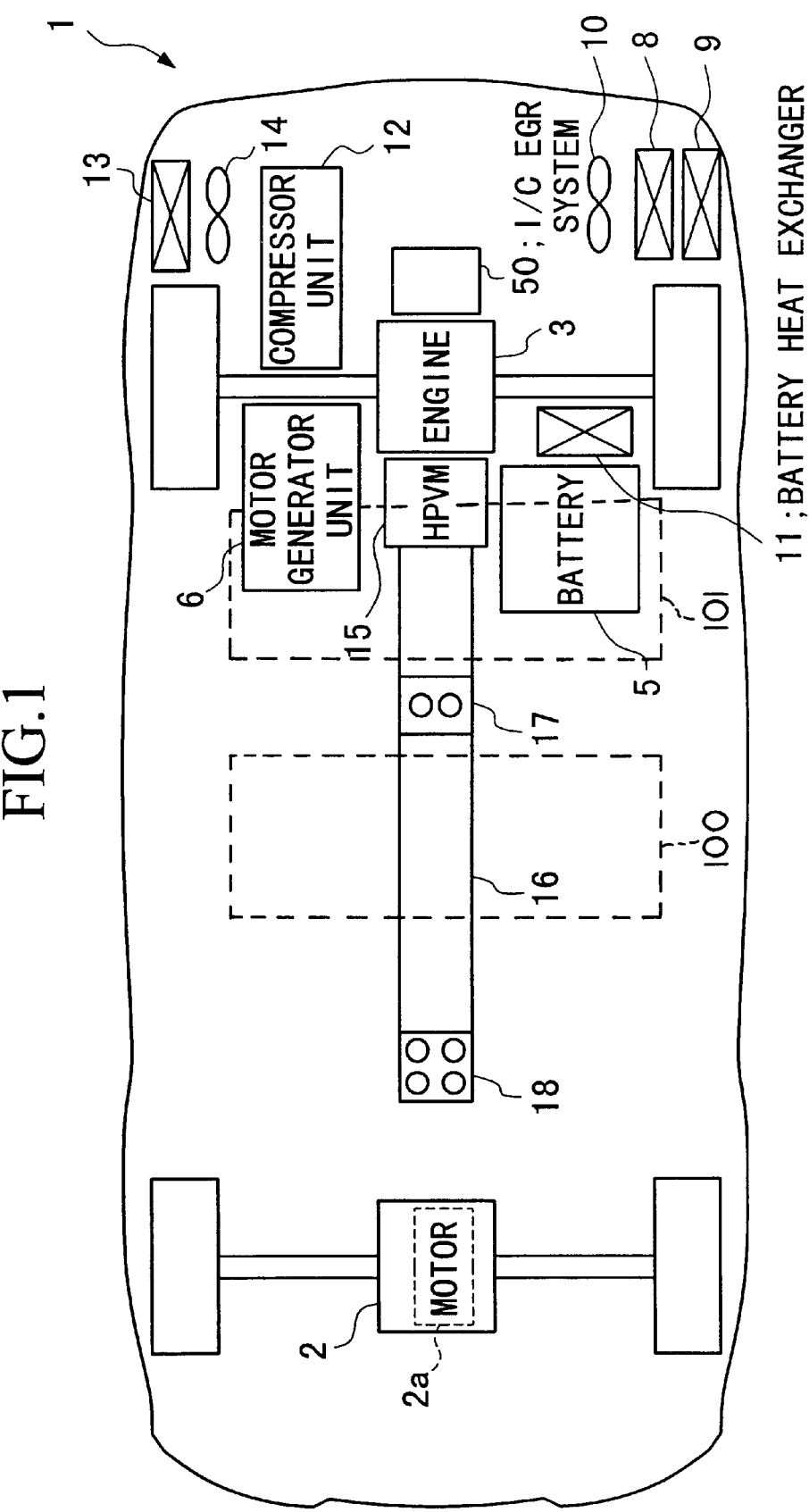
FIG. 1 is a diagram showing an arrangement of a hybrid vehicle mounted with a vehicular air conditioner, shown as one embodiment of the present invention.

In FIG. 1, numeral 1 denotes a hybrid vehicle, equipped with a drive unit 2 in the front part of the vehicle having a motor 2a housed therein for driving front wheels, and an engine 3 in the rear part of the vehicle for driving rear wheels. The hybrid vehicle runs at the time of low speed driving, using the driving motor 2a as a drive source and runs at the time of high speed driving exceeding a certain speed, by switching the drive source to the engine 3. Since the motor 2a is provided in the front part of the vehicle, the engine 3 is arranged in the rear part of the vehicle, in consideration of the freedom of installation space and reduction of air resistance.

In addition, there is a case where the engine 3 and the motor 2a are activated as the drive source at the same time.

In FIG. 1, numeral 5 denotes a battery which is a power source for the motor 2a, and numeral 6 denotes a motor generator unit for converting the driving force of the engine 3 into electrical power and storing the electrical power in the battery 5. An electrical power generation motor (not shown) is mounted in the motor generator unit 6, and electrical power is generated by transmitting the driving force of the engine 3 to the electrical power generation motor. Moreover, the motor generator unit 6 has the function of converting electrical power stored in the battery 5 into the driving force, by driving the electrical power generation motor with the electrical power.

The battery 5 is a lithium polymer battery. Numeral 50 denotes an I/C (inter-cooler) EGR (Exhaust Gas Recirculation) system.

Moreover, numeral 8 denotes a first radiator for cooling the engine 3, and 9 denotes a second radiator provided together with the first radiator 8. The second radiator 9 is for cooling the driving motor 2a, the motor generator unit 6 and the I/C EGR system 50. The first radiator 8 and second radiator 9 are so constructed that heat is discharged to the surrounding air by a fan 10 for the cooling radiators.

Moreover, there is provided a battery heat exchanger 11 for transferring heat from the engine 3 to the battery 5.

Next is a description of an air conditioner mounted in the hybrid vehicle 1.

Figure 3:
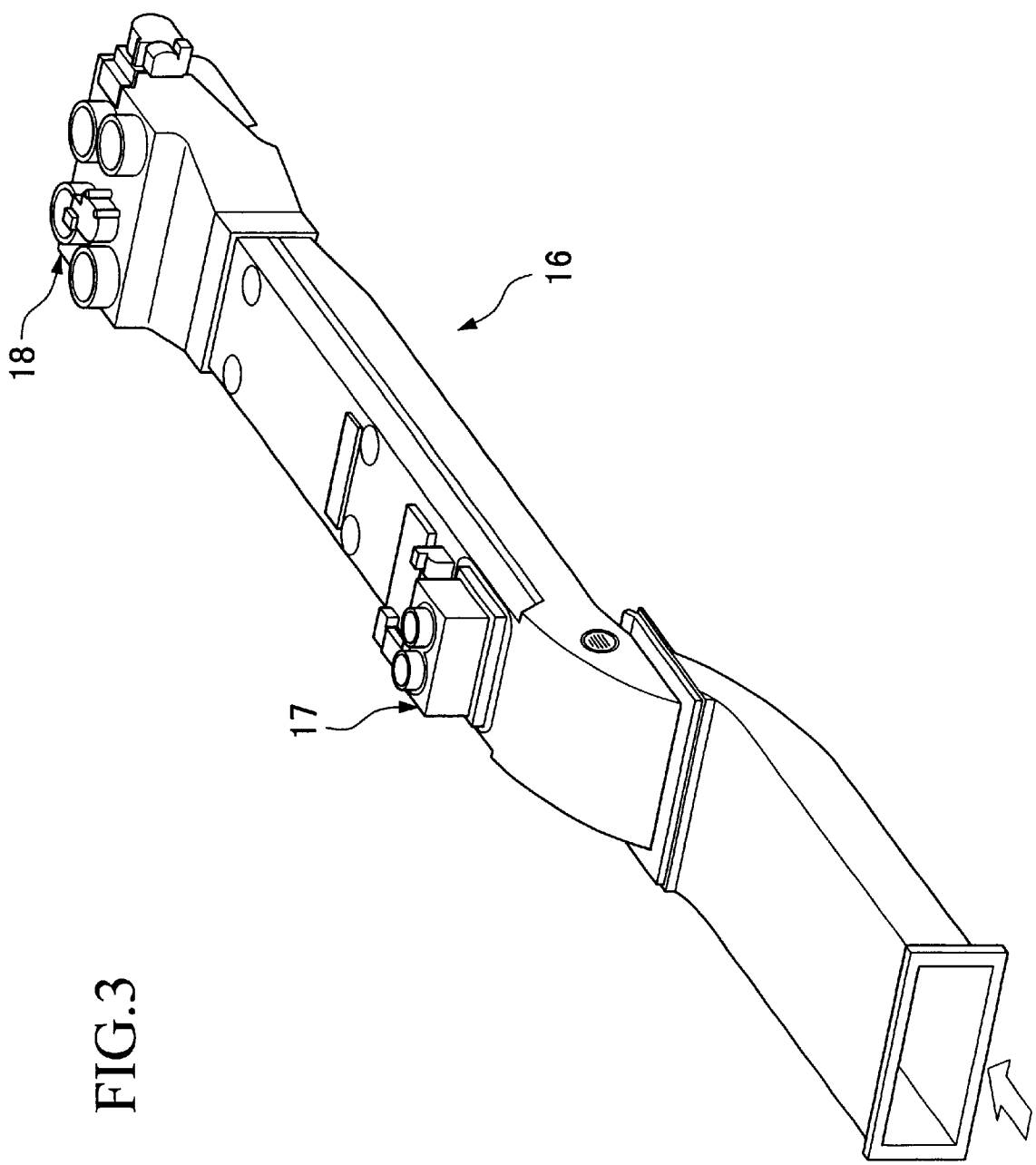
FIG. 3 is a perspective view of a duct which carries air conditioned by the HPVM.

In FIG. 1, numeral 12 denotes a compressor unit for compressing a refrigerant, 13 denotes a heat exchanger, 14 denotes a fan for blowing air to the heat exchanger 13, and 15 denotes a module referred to as an HPVM (Heat Pump Ventilating Module). The heat exchanger 13 is provided on the right side of the vehicle body for facilitating heat exchange with outside air, and heat is forcibly exchanged with outside air by the fan 14. The HPVM 15 is arranged in the middle of the rear part of the vehicle body, and is connected to a duct 16 extending to the front of the vehicle body along a center of the lower part of the vehicle body. As shown in FIG. 3, the duct 16 is formed in a tubular shape, and is provided with air outlet section 17 and 18 in the central portion and in the front end of the duct 16, respectively.

The HPVM 15 will now be described in detail.

Figure 2:
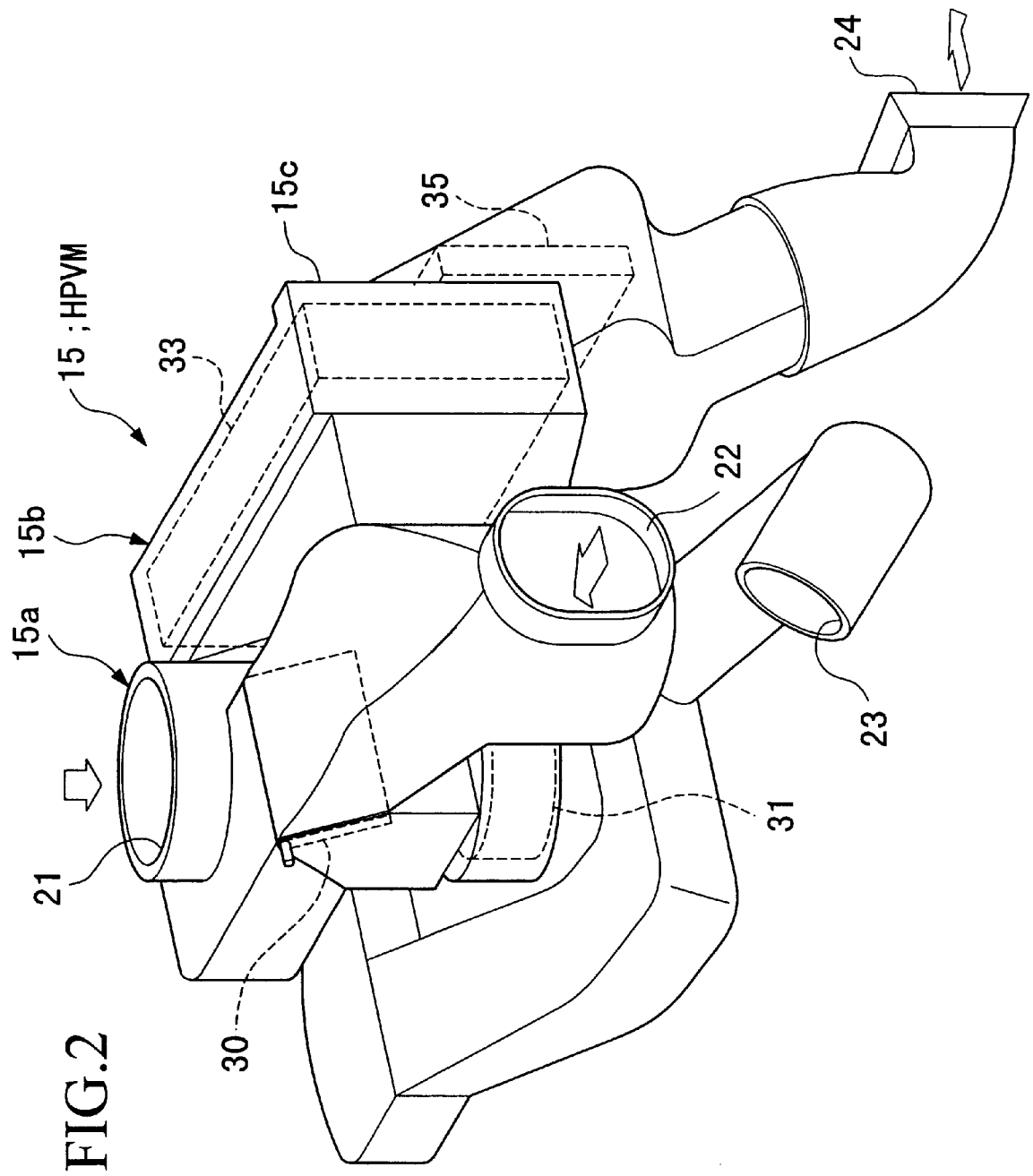
FIG. 2 is a perspective view of an HPVM mounted in the hybrid vehicle.
Figure 4:
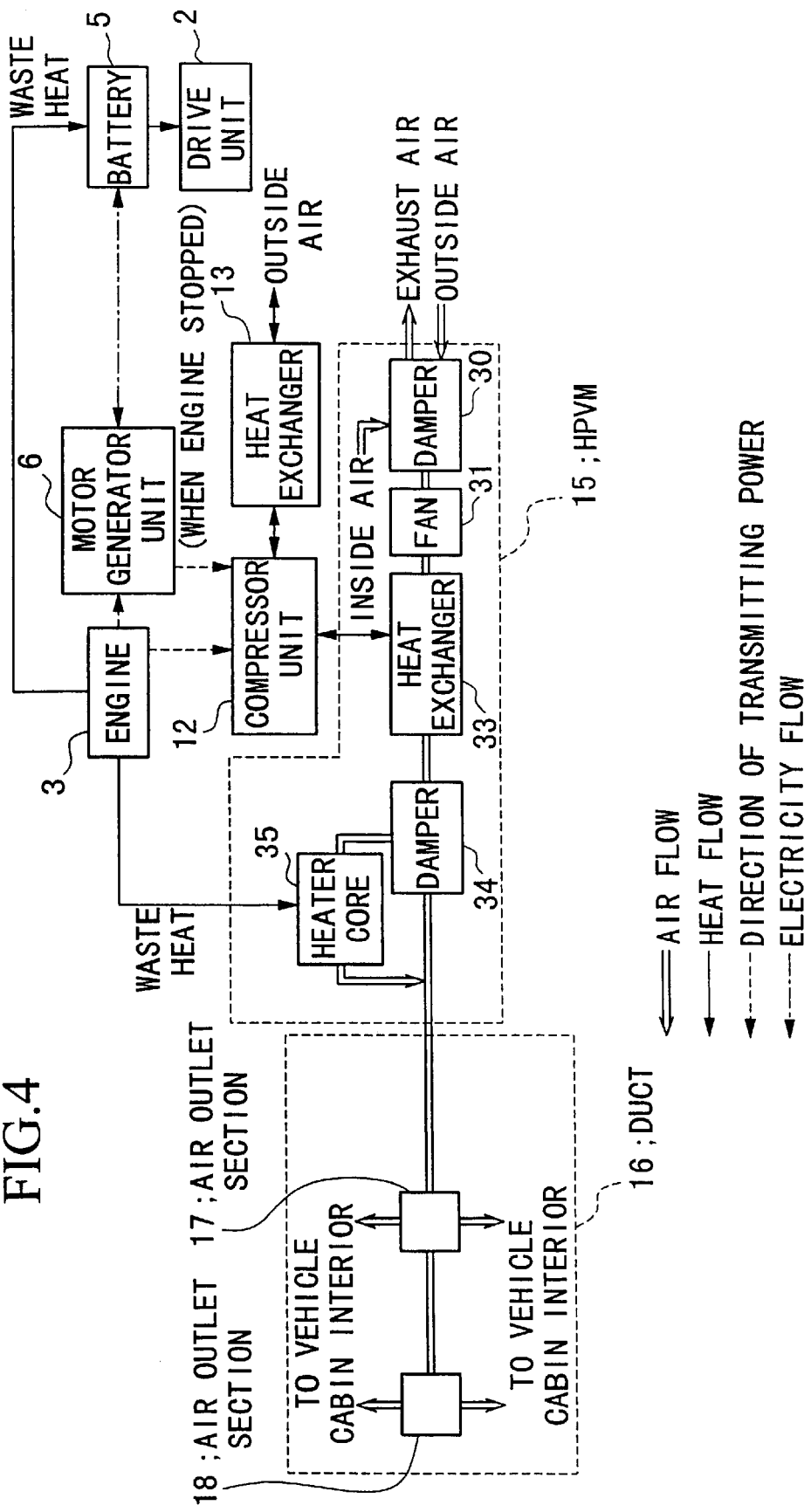
FIG. 4 is a block diagram of the hybrid vehicle.

FIG. 2 shows a perspective view of the HPVM 15, and FIG. 4 shows a block diagram of the air conditioner.

In FIG. 2, the HPVM 15 is constructed with an air intake unit 15a and an air conditioning unit 15b integrally housed in a casing 15c. The casing 15c comprises an inside air intake 21, an outside air intake 22, a discharge port 23 and a connecting portion 24 for connecting the HPVM to the duct 16. The inside air intake 21 is communicated with the vehicle cabin, and the outside air intake 22 and the discharge port 23 are communicated with the outside of the vehicle cabin.

Moreover, as shown in FIG. 4, the HPVM 15 is equipped with an inside air/outside air changeover damper 30 for determining which of either air inside of the vehicle cabin (inside air) or air outside of the vehicle cabin (outside air) is to be drawn in, a fan 31 (blower device) for introducing air via the inside air/outside air changeover damper 30, a heat exchanger (cooling apparatus heat exchanger) 33 for exchanging heat between the introduced air and the refrigerant, an air mix damper 34 for branching a part of the heat exchanged air, and a heater core (engine heat exchanger) 35 for heating the branched air.

The inside air intake 21, the outside air intake 22, the discharge port 23, the inside air/outside air changeover damper 30, and the fan 31 constitute the air intake unit 15a, and the heat exchanger 33 and the heater core 35 constitute the air conditioning unit 15b.

By opening or closing the inside air/outside air changeover damper 30, it is possible to select either one of an inside air circulating operation for drawing in inside air from the inside air intake 21 (see FIG. 2) and sending the air to the duct 16, or an outside air introducing operation for introducing outside air from the outside air intake 22 (see FIG. 2) and sending the air to the duct 16, as well as discharging inside air from the discharge port 23 (see FIG. 2).

The heater core 35 is a heat exchanger for receiving a supply of high temperature coolant (engine coolant) from the engine 3, as described below, and heating a flow of introduced air. This is used supplementarily at the time of the heating operation (heat pump operation) of the air conditioner. The air mix damper 34 is for adjusting the quantity of introduced air branched off to the heater core 35, according to the opening thereof.

The introduced air is then blown to the vehicle cabin from the air outlet sections 17 and 18 of the duct 16.

Figure 5:
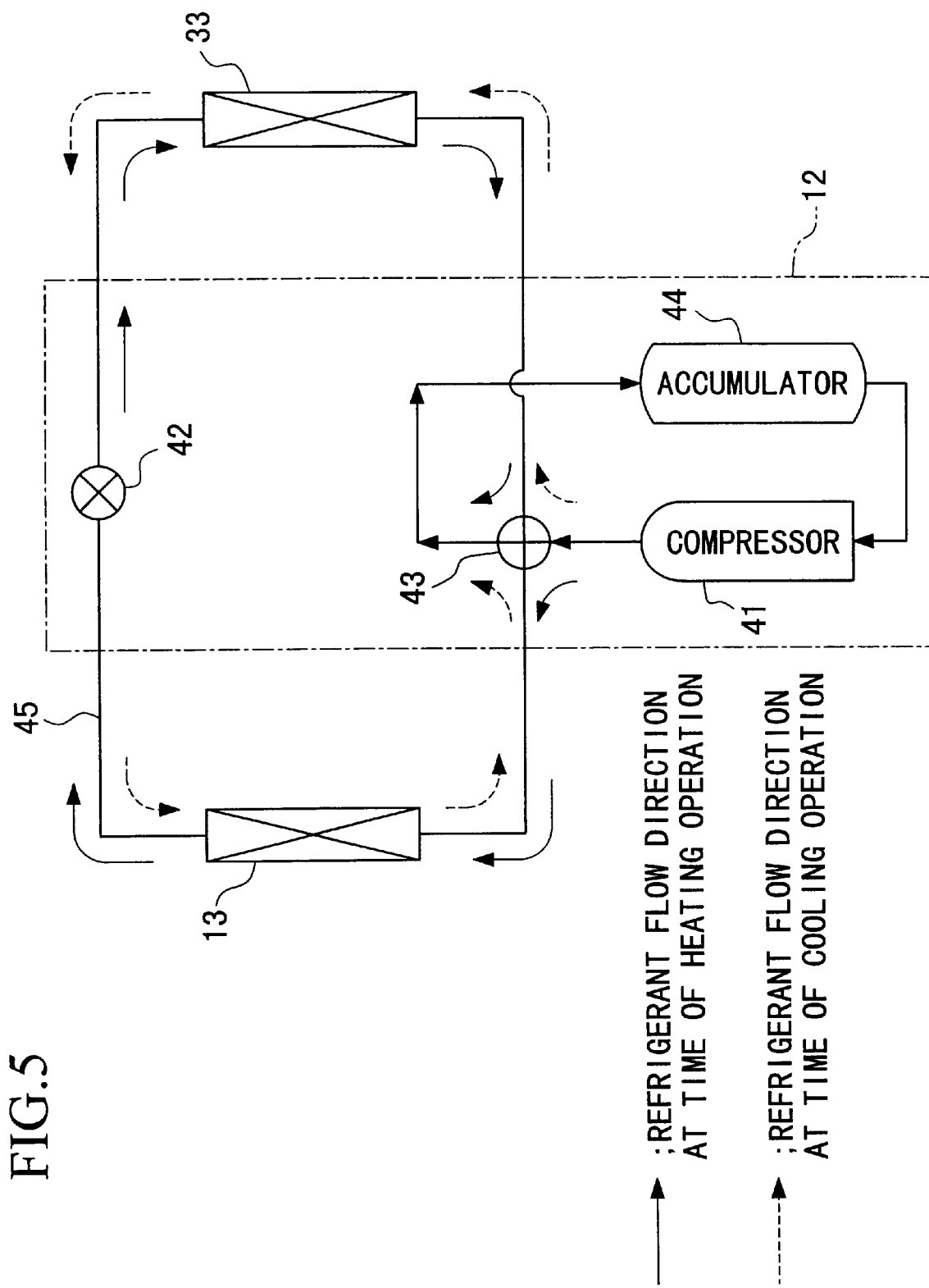
FIG. 5 is a diagram showing a refrigerant path of the air conditioner mounted in the hybrid vehicle.

The cooling operation or heating operation is effected by supplying refrigerant to the heat exchanger 33 and the heat exchanger 13 by the compressor unit 12. FIG. 5 shows the compressor unit 12.

As shown in FIG. 5, the compressor unit 12 includes, as main components, a compressor 41, a throttling resistance 42, a four way valve 43 and an accumulator 44. The above described heat exchangers 13 and 33 are connected between these respective devices by a refrigerant path 45 to form a refrigerant circuit.

Here, the heat exchanger 13, the heat exchanger 33 and the compressor unit 12 constitute a cooling apparatus.

A driving force is transmitted to the compressor 41 by the engine 33 or the motor generator unit 6 serving as the drive source. The compressor 41 has the function of compressing the refrigerant which has absorbed heat and been gasified in an evaporator, and discharging and sending the refrigerant as a high temperature and high pressure gas refrigerant to the four way valve 43. The flow direction of the high temperature and high pressure gas refrigerant discharged from the compressor 41 is changed by changing the four way valve 43, resulting in changeover of the cooling or heating operation. Moreover, the throttling resistance 42 has the function of decompressing and expanding the high temperature and high pressure liquid refrigerant to give a low temperature and low pressure liquid refrigerant. Thus uses a capillary tube or an expansion valve. The accumulator 44 is provided for removing the liquid component contained in the gas refrigerant, so as to prevent a part of the liquid refrigerant which has not been evaporated completely by the evaporator from being drawn in directly to the compressor 41.

With the above described refrigerant circuit, at the time of the heating operation, the low temperature and low pressure liquid refrigerant is evaporated and gasified in the heat exchanger 33 (which operates as a condenser at the time of cooling) by absorbing heat from outside air, to become a low temperature and low pressure gas refrigerant, and is then sent to the compressor 41 and is compressed into a high temperature and high pressure gas refrigerant. Thereafter, in the heat exchanger 13 (which operates as an evaporator at the time of cooling) the gas refrigerant releases heat to heat the air and is condensed and liquefied, after which it is expanded by passing through the throttling resistance 42 to become a low temperature and low pressure liquid refrigerant, and is circulated again to the heat exchanger 33. In this case, the heat exchanger 33 operates as an evaporator and heats the refrigerant. Moreover, the heat exchanger 13 operates as a condenser and cools the refrigerant.

At the time of the cooling operation, the high temperature and high pressure gas refrigerant supplied to the heat exchanger 33 is condensed and liquefied by discharging heat to the outside air. This is then expanded by the throttling resistance 42, and sent to the heat exchanger 13 to be evaporated and gasified, and is then sent to the compressor 41 and is again circulated to the heat exchanger 33. In this case, the heat exchanger 33 operates as a condenser and the heat exchanger 13 operates as an evaporator.

That is to say, by changing the four way valve, one heat exchanger (heat exchanger 33) of the cooling apparatus arranged in the air conditioning unit operates as an evaporator to demonstrate a cooling ability, and also operates as a condenser to demonstrate a heating ability.

When the heat exchanger 33 operates as an evaporator, cooling, dehumidifying and temperature adjustment can be effected. Specifically, when only the cooling apparatus is operated, cooling is effected, while when both the cooling apparatus and the heater core 35 are operated at the same time, the cooled air can be heated, enabling dehumidification.

Moreover, when the heat exchanger 33 operates as a condenser, this can act in place of the heater core 35. Therefore, even when there is no heating effect from the heater core 35 due to a low temperature of the engine coolant, such as immediately after starting the engine operation, heating ability can be demonstrated. Moreover, this supplementary heating operation immediately after starting the engine operation naturally has a sufficient heating ability for when driving under electrical power, without using the engine.

Next is a description of the air outlet sections 17 and 18 which discharge the introduced air.

The air outlet section 17 is located at a middle portion between the front seat 100 and the rear seat 101. The air outlet section 18 is located in the vicinity of the feet of the front seat passengers.

Figure 7A:
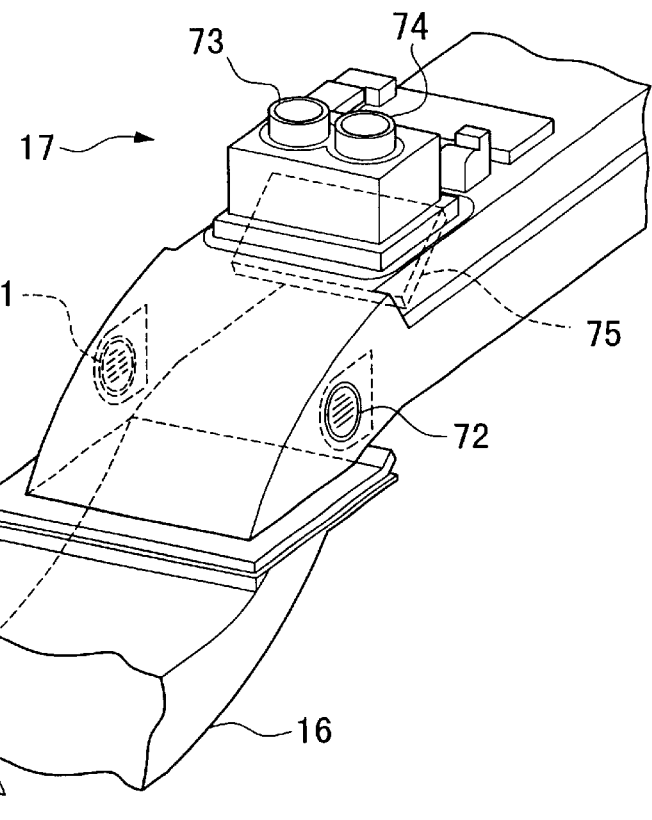
FIG. 7 is a diagram showing an air outlet section provided in the duct, being an air outlet section for blowing air to the rear seat.

The air outlet section 17 includes, as shown in FIG. 7(a), foot air outlets 71 and 72 for blowing air in the left and right direction, and air outlets 73 and 74 for blowing air upwards.

The reason why two each of these air outlets are provided, is to blow air to the left and right passengers.

Figure 7B:
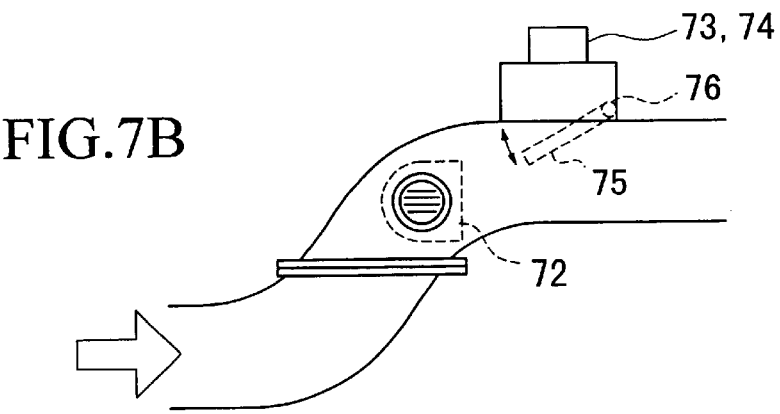

Air in the duct 16 is distributed and blown from the air outlets 73 and 74 by means of an air outlet opening and closing damper 75. The air outlet opening and closing damper 75 is, as shown in FIG. 7(b), provided on the inside upper face of the duct 16, with a pivot axis 76 located on the downstream side. The construction is such that when the air outlet opening and closing damper 75 is opened, a part of the air flowing in the duct 16 is sent to the air outlets 73 and 74 by means of the air outlet opening and closing damper 75.

Figure 7C:
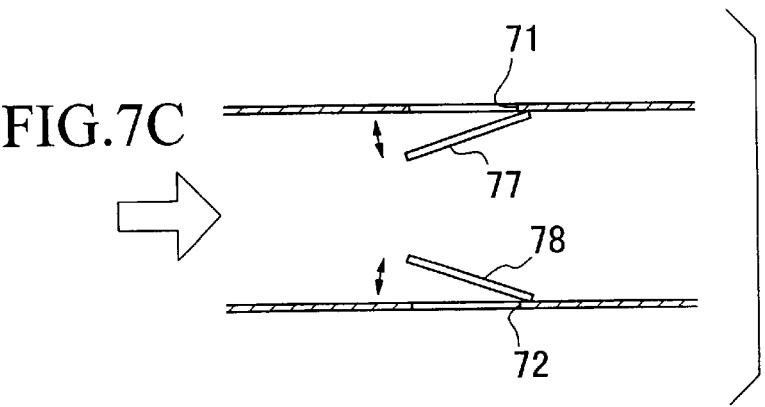

As shown in FIG. 7(c), air in the duct 16 is also distributed by means of the air outlet opening and closing dampers 77 and 78 and blown from the foot air outlets 71 and 72. The air outlet opening and closing dampers 77 and 78 are provided on the inner side faces of the duct 16 with a pivot axis located on the downstream side, and are turned by a common motor (not shown). The construction is such that when the air outlet opening and closing dampers 77 and 78 are opened, a part of the air flowing in the duct 16 is sent to the foot air outlets 71 and 72 by means of the air outlet opening and closing dampers 77 and 78.

Figure 8A:
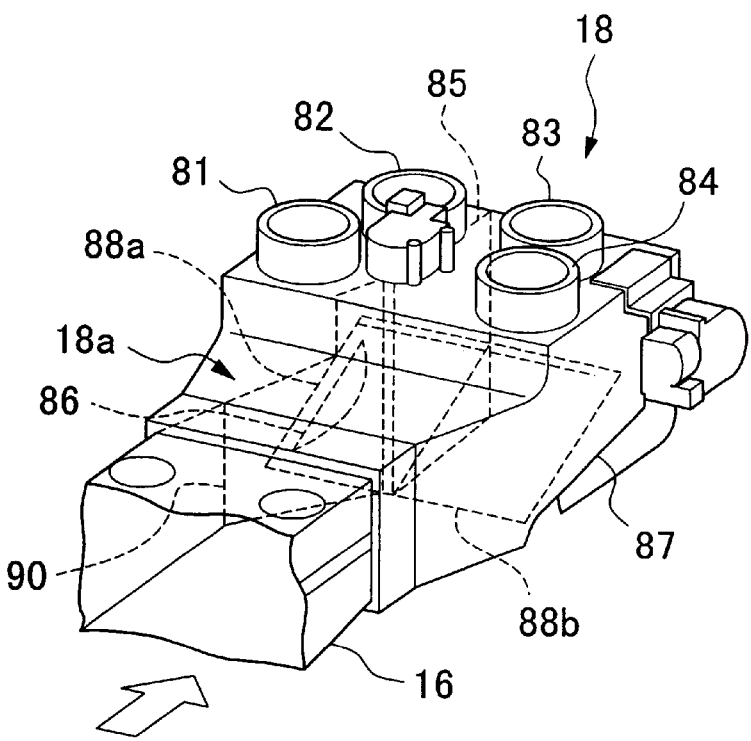
FIG. 8 is a diagram showing an air outlet section provided in the duct, being an air outlet section for blowing air to the front seat.

As shown in FIG. 8(a), the air outlet section 18 includes face air outlets 81, 82, 83 and 84 for blowing air upwards, and foot air outlets 86 and 87 for blowing air to the left and right. The face air outlets 81 and 82, and the foot air outlet 86 are outlets for blowing air to the assistant driver's side, and the face air outlets 83 and 84, and the foot air outlet 87 are outlets for blowing air to the driver's side.

Figure 8B:
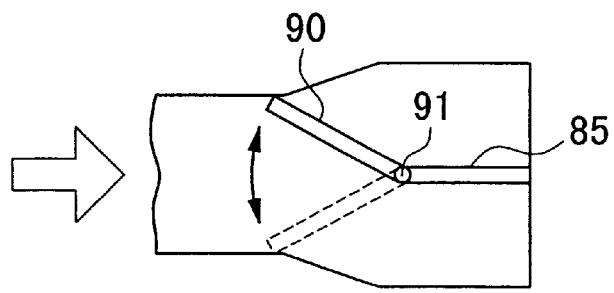

As shown in FIG. 8(b), a partition plate 85 is provided in the air outlet section 18, for dividing the introduced air path to the left and right sides, thereby forming a branching section 18a. On the upstream side of the partition plate 85, there is provided a lateral distribution damper 90 which turns either left or right. The introduced air distributed to the left side by the partition plate 85 blows from the air outlets 81, 82 and 86, while the introduced air distributed to the right side blows from the air outlets 83, 84 and 87. The quantity distributed to the left and right sides is determined by the turning of the lateral distribution damper 90.

Figure 8C:
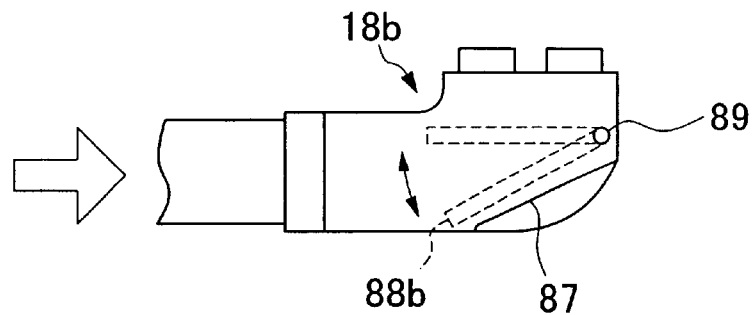

As shown in FIG. 8(c), a branching section 18b is further provided in the left and right flow paths.

In the left and right flow paths, there are provided vertical distribution dampers 88a and 88b, having a common rotation axis 89. Air passing through the upper part of the vertical distribution dampers 88a and 88b is communicated with the face air outlets 81-84, while air passing through the lower part thereof is communicated with the foot air outlets 86 and 87. In the fully down condition, as shown in FIG. 8(c) by the solid line, the flow path communicating with the foot air outlets 86 and 87 is closed to thereby blow all the air flowing in the duct 16 upward. In the fully up condition, as shown by the broken line, the flow path communicating with the face air outlets 81~84 is closed to thereby blow all the air flowing in the duct 16 to the foot air outlets 86 and 87.

The opening of the above described dampers 75, 77, 78, 88a, 88b and 90 for the air outlet sections 17 and 18 is remotely controlled by passengers.

With the above construction, for safe operation it is required that the temperature of the above described drive unit 2 and the motor generator unit 6 is not higher than 65° C. Moreover, the temperature of the battery 5 is ideally 85±5° C. from the view point of storage efficiency. To satisfy this requirement, in the hybrid vehicle 1, the temperature of the coolant is controlled as described below.

Figure 6:
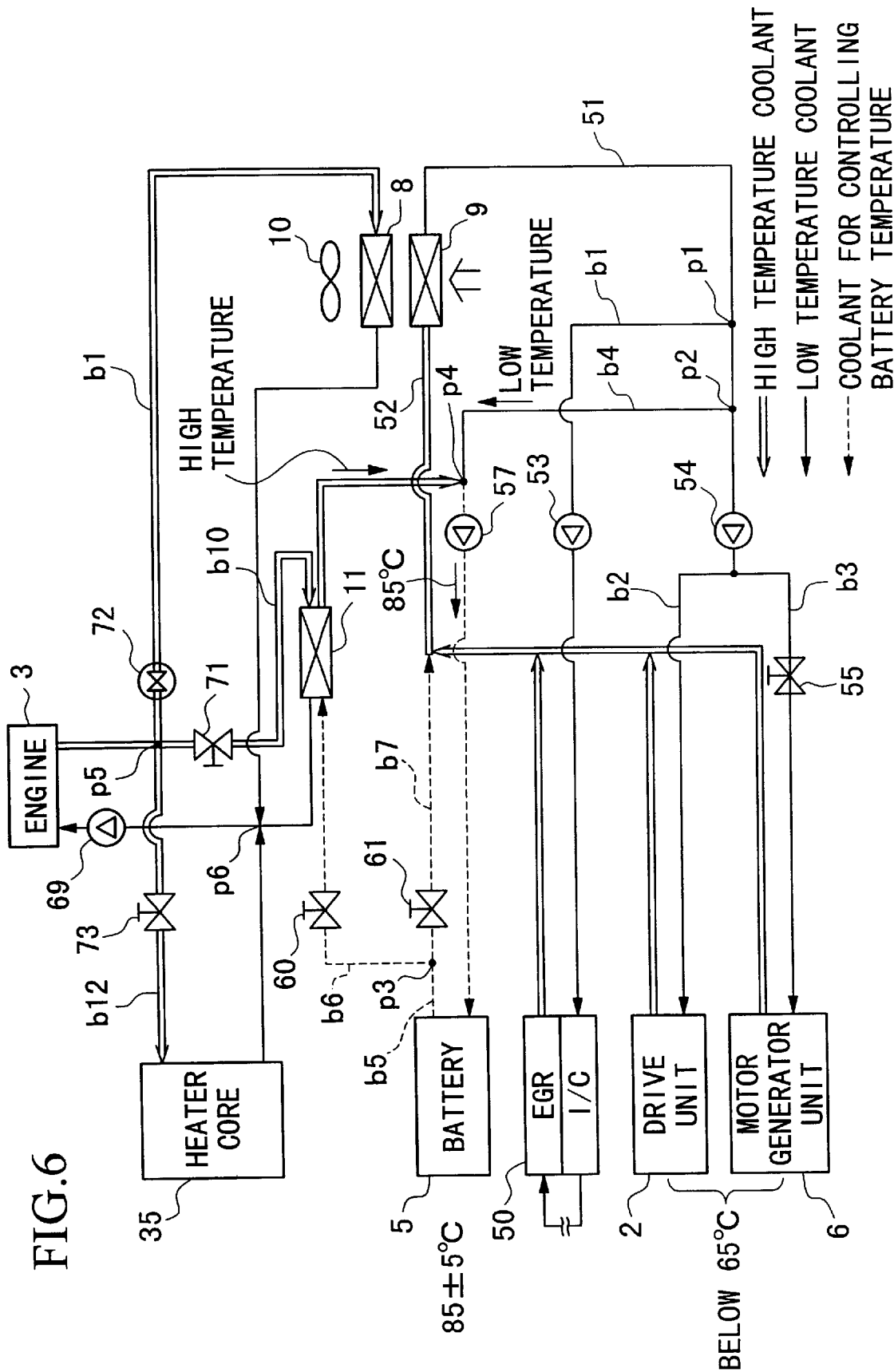
FIG. 6 is a diagram showing the flow of coolant in the hybrid vehicle.

As shown in FIG. 6, there are formed predetermined flow paths for flowing a coolant between the engine 3, the battery 5, the I/C EGR system 50, the drive unit 2, the motor generator unit 6, the first radiator 8, the second radiator 9 and the battery heat exchanger 11.

The engine 3 is cooled by the first radiator 8, and the battery 5, the I/C EGR system 50, the drive unit 2 and the motor generator unit 6 are cooled by the second radiator 9.

Next is a detailed description of the flow path.

The I/C EGR system 50 (not shown), the drive unit 2 and the motor generator unit 6 are cooled by a coolant supplied from the second radiator 9.

First, the coolant is supplied from the outlet side of the second radiator 9 to the flow path 51. The coolant is branched, at a branch point p1, to the I/C EGR system 50 side and the drive unit 2 and motor generator unit 6 side.

The coolant branched to the I/C EGR system 50 side is supplied into the I/C EGR system 50 via an inter-cooler coolant pump 53 interposed in a flow path b1. After cooling the apparatus system in the I/C EGR system 50, the coolant is again circulated to the second radiator 9 via a flow path 52. At this time, a flow velocity is given to the coolant by the intercooler coolant pump 53 to make the coolant flow in the flow path b1.

On the other hand, the coolant branched to the drive unit 2 and the motor generator unit 6 side is further branched at a branch point p2, after which a part of the coolant is further branched via a traction coolant pump 54. One part is branched to a flow path b2 on the drive unit 2 side, and the other is branched to a flow path b3 on the motor generator unit 6 side. The coolant after branching is supplied to the drive unit 2 and the motor generator unit 6, respectively, similar to the coolant supplied to the I/C EGR system 50, for cooling the apparatus system, and is then again circulated to the second generator 9 via the flow path 52. At this time, a flow velocity is given to the coolant by the traction coolant pump 54 to make the coolant flow in the flow paths b2 and b3.

Here, the drive unit 2 is disposed in the front part of the vehicle body, as shown in FIG. 1. On the other hand, the motor generator unit 6 and the second radiator 9 are disposed in the rear part of the vehicle body. That is, the flow path b2 is longer than the flow path b3, and has a larger coolant flow resistance. Therefore, when it is necessary to make the coolant flow to both the drive unit 2 and the motor generator unit 6, the flow rate on the motor generator unit 6 side becomes higher than that on the drive unit 2 side, resulting in uneven balance. To solve this problem, a flow rate adjusting valve 55 is interposed in the flow path b3 to maintain the flow rate balance with the flow path b2.

The other coolant branched at the branch point p2 flows to the battery 5 side in a flow path b4 in which a battery coolant pump 57 is interposed.

At a junction p4 before the battery coolant pump 57, this merges with a high temperature coolant heated by the heat of the engine 3. The high temperature coolant will be described later. The flow rate is adjusted beforehand so that after merging, the coolant attains a predetermined temperature (85±5° C.).

Thereafter, the coolant is supplied to the battery 5, and discharged to the outlet flow path b5, while maintaining the battery 5 within the above described predetermined temperature. The coolant is branched at a branch point p3 to flow paths b6 and b7. The construction is such that the flow path b6 passes through the battery heat exchanger 11 and joins the flow path b4 at the junction p4, and the flow path b7 joins the flow path 52 and is then circulated again to the second radiator 9. A flow rate adjusting valve 60 is interposed in the flow path b6, and a flow rate adjusting valve 61 is interposed in the flow path b7. The flow rate adjusting valves will be described later.

The coolant flowing in the flow path b6 is heated by the heat of the engine 3 in the battery heat exchanger 11. In more detail, in the battery heat exchanger 11, heat is exchanged between the flow path b6 and the flow path b10 which circulates the coolant between the engine 3 and the battery heat exchanger 11. Since the temperature of the coolant in the flow path b10 heated by the engine 3 is higher than that of the coolant in the flow path b6 (85±5° C.), the coolant in the flow path b6 is heated to become a high temperature coolant, and merges with the low temperature coolant in the flow path b4 at the junction p4.

In this way, the high temperature coolant and the low temperature coolant merge at the junction p4, to thereby supply the above described coolant having a predetermined temperature to the battery 5. By adjusting the quantity of the high temperature coolant by the above described flow rate adjusting valves 60 and 61, the temperature of the coolant supplied to the battery 5 is controlled.

Another flow path b11 to the engine 3 is provided independent of the above described flow path b10, to circulate the coolant between the first radiator 8 and the engine 3. Moreover, a flow path b12 is provided to circulate the coolant between the heater core 35 and the engine 3.

The coolant discharged from the engine 3 is branched at a branch point p5 to flow paths b10, b11 and b12, and passes through the battery heat exchanger 11, the first radiator 8 and the heater core 35, respectively, after which it merges at the junction p6, and is then circulated again to the engine 3.

An engine coolant pump 69 is provided in the flow path on the inlet side of the engine 3, to make the coolant flow in flow paths b10~b12. Moreover, in the flow paths b10 and b12 there are provided flow rate adjusting valves 71 and 73, respectively, and in the flow path b11 there is provided a thermostat 72.

The first radiator 8 and the above described second radiator 9 are provided in parallel, and since the coolant flowing through the first radiator 8 has a higher temperature, a suction type radiator cooling fan 10 is arranged on the downstream side of the first radiator 8, so that air passing through the second radiator 9 passes through the first radiator 8.

Next is a description of the operation of the above described air conditioner.

As described above, the hybrid vehicle 1 travels at the time of low speed driving, using the driving motor 2a as a drive source and travels at the time of high speed driving exceeding a certain speed, by switching the drive source to the engine 3. Hence, the drive source of the air conditioner is also different from that of the conventional vehicular air conditioner.

First, when the hybrid vehicle 1 travels using the engine 3, the compressor unit 12 is driven by the driving force from the engine 3 at the time of air conditioning, to circulate the refrigerant between the heat exchangers 13 and 33. The engine 3 also transmits a driving force to the motor generator unit 6, and the motor generator unit 6 generates electrical power by a motor (not shown), and stores the electrical power in the battery 5.

With the HPVM 15, the fan 31 introduces inside air or outside air via the inside air/outside air changeover damper 30 to blow air to the heat exchanger 33. The heat of the introduced air is exchanged with the refrigerant in the heat exchanger 33, to thereby be heated (at the time of the heating operation), or cooled ( at the time of the cooling operation).

The air, after being heated is directed to the duct 16 or the heater core 35 by means of the air mix damper 34, and the introduced air sent to the heater core 35 is further heated by the waste heat of the engine 3 and then sent to the duct 16.

On the other hand, when the motor 2a is driving and the engine 3 is stopped, operation is as follows. That is, the motor generator unit 6 drives the electrical power generating motor housed therein, using the electrical power stored in the battery 5. The driving force is transmitted to the compressor unit 12 to thereby circulate the refrigerant between the heat exchangers 13 and 33. Other operation is similar to that when the engine 3 is driving.

The introduced air sent to the duct 16 is outlet into the vehicle cabin from the air outlet sections 17 and 18.

At first, the opening of the air outlet opening and closing dampers 77 and 78 is adjusted at the air outlet section 17 by a passenger, to thereby blow air at the feet of passengers on the left and right sides in the rear seat, respectively from the foot air outlets 71 and 72. Moreover, the opening of the air outlet opening and closing damper 75 is adjusted to blow air to the passenger's bodies on the left and right sides in the rear seat, respectively, from the air outlets 73 and 74.

The air outlet section 18 blows air to the front seat. First the introduced air is distributed to the left and right sides by the lateral distribution damper 90. Moreover, the air is divided into air blown to the feet and air blown to the face, by the vertical distribution dampers 88a and 88b. Air is blown to the feet of passengers on the left and right sides, respectively from the foot air outlets 86 and 87, to the upper body of a passenger on the left side from the face air outlets 81 and 82, and to the upper body of a passenger on the right side from the face air outlets 83 and 84.

With the vehicular air conditioner according to this embodiment as described above, the refrigerant is compressed by the compressor arranged in the rear part of the vehicle body, and heat is exchanged between the refrigerant and the introduced air in the heat exchanger in the rear part of the vehicle body. Therefore, conditioned air is generated in the rear part of the vehicle body. That is, the construction is such that conditioned air is not generated in the front part of the vehicle body by piping the refrigerant to the front part of the vehicle body, but conditioned air is generated in the rear part of the vehicle body, and the air is sent to the front part of the vehicle body by the duct. Hence, the quantity of refrigerant can be reduced, and air can also be blown into the vehicle cabin between the front seat and the rear seat, enabling sufficient air conditioning in the rear seat.

As described above, with the vehicular air conditioner according to this embodiment, conditioned air is sent from the rear seat to the front seat via the duct, and air outlets are provided along the flow path. Hence air conditioning can be effected uniformly in the vehicle cabin. Moreover, there is no need to pipe the refrigerant to the front part of the vehicle body, thereby reducing the piping length of the refrigerant. Hence, the quantity of liquid refrigerant having a large specific gravity in the liquid refrigerant piping can be reduced, enabling a reduction in weight and cost, as well as a reduction in piping length. Moreover, the piping cost and the weight of the vehicle body can be reduced, due to the reduction in piping length.

Furthermore, since the air quantity blown into the vehicle cabin can be adjusted by the air outlet opening and closing damper, and the air can be distributed to each flow path by the lateral distribution damper and the vertical distribution damper, the outlet quantity to the passengers on the left and right sides, and the air quantity blown to the feet or the passengers' upper body can be adjusted. Hence a comfortable vehicle cabin environment can be obtained.

Furthermore, since the air conditioner is a heat pump type, the heating operation can be effected regardless of the temperature of the engine coolant. For example, even when the engine coolant is at a low temperature just after starting the engine operation, rapid heating can still be effected.

What is claimed is:

1. An air conditioner in a vehicle having a drive source and a cabin interior, said air conditioner comprising:
    a compressor arranged in a rear part of the vehicle;
    an air intake unit comprising an inside air intake configured to draw in air from the cabin interior, an outside air intake configured to draw in air from outside of the cabin interior, an inside air/outside air changeover damper configured to selectively determine from which of either the inside air intake or the outside air intake air is to be drawn in, and a blower disposed on a downstream side of the inside air/outside air changeover damper;
    an air conditioning unit into which air is introduced from said air intake unit, provided along an introduced air distribution path with a cooling apparatus heat exchanger fluidly connected to said compressor and configured to exchange heat between the introduced air and air outside the cabin interior, said cooling apparatus heat exchanger being located in the rear part of the vehicle, and also provided with an engine heat exchanger configured to exchange heat between the introduced air and an engine of the vehicle; and
    a duct into which air is introduced from said air conditioning unit, said duct being configured to distribute the introduced air from the rear part of the vehicle to a front part of the vehicle, said duct being provided with air outlets configured to discharge the introduced air into the cabin interior,
    wherein said duct is located under a rear seat of the vehicle and at a widthwise center of the vehicle, and
    wherein said air outlets are located in the front part of the vehicle and between a front seat and the rear seat of the vehicle.

2. An air conditioner in a vehicle according to claim 1, wherein said air outlets located between the front seat and the rear seat are provided on both an upper face and a side of the duct.

3. An air conditioner in a vehicle according to claim 1, further provided with an air outlet opening damper configured to control outlet of air from said air outlets.

4. An air conditioner in a vehicle according to claim 2, wherein said air outlet located in the front part of the vehicle is divided into a face air outlet provided on the upper face of the duct and a foot air outlet provided on sides of the duct.

5. An air conditioner in a vehicle according to claim 1, wherein said air outlet located in the front part of the vehicle is divided into a face air outlet provided on an upper face of the duct and a foot air outlet provided on sides of the duct.

6. An air conditioner in a vehicle according to claim 5, wherein a partition plate configured to branch said duct into left and right flow paths is provided in said duct located in the front part of the vehicle, and a lateral distribution damper configured to distribute air to the left and right flow paths is provided on an upstream side of said partition plate.

7. An air conditioner in a vehicle according to claim 6, wherein a vertical distribution damper configured to turn up and down is provided on a downstream side of said lateral distribution damper, and air passing through an upper part of said vertical distribution damper is distributed to said face air outlet, and air passing through a lower part of said vertical distribution damper is distributed to said foot air outlet.

8. An air conditioner in a vehicle according to claim 1, wherein a partition plate configured to branch said duct into left and right flow paths is provided in said duct located in the front part of the vehicle, and a lateral distribution damper configured to distribute air to the left and right flow paths is provided on an upstream side of said partition plate.

* * * * *

UNITED STATES PATENT AND TRADEMARK OFFICE
CERTIFICATE OF CORRECTION

PATENT NO. : 6,332,497 B1
DATED : December 25, 2001
INVENTOR(S) : Niwa et al.

Page 1 of 1

It is certified that error appears in the above-identified patent and that said Letters Patent is hereby corrected as shown below:

Title page,
Item [45], and the Notice information should read:
-- [45] Date of Patent: **\*Dec. 25, 2001** --
-- [\*]   Notice:   This patent issued on a continued prosecution application filed under 37 CFR 1.53(d), and is subject to the twenty year patent term provisions of 35 U.S.C. 154(a)(2).

Subject to any disclaimer, the term of this patent is extended of adjusted under 35 U.S.C. 154(b) by 0 days. --

Signed and Sealed this

Seventh Day of May, 2002

*Attest:*

*Attesting Officer*

JAMES E. ROGAN
*Director of the United States Patent and Trademark Office*